UNITED STATES PATENT OFFICE.

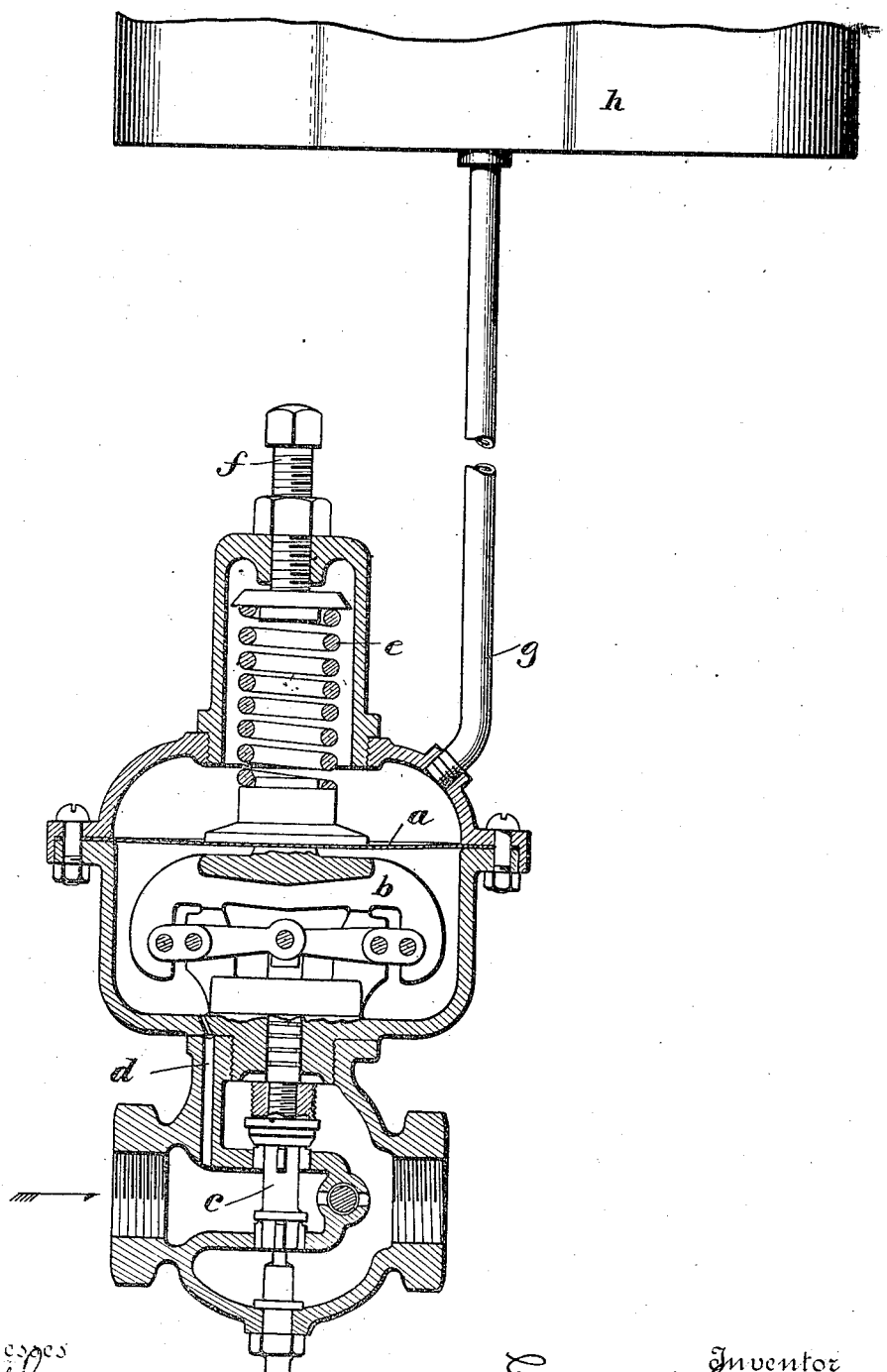

EMBURY McLEAN, OF NEW YORK, N. Y.

PRESSURE-REGULATING VALVE.

No. 837,332.    Specification of Letters Patent.    Patented Dec. 4, 1906.

Application filed May 6, 1905. Serial No. 259,242.

*To all whom it may concern:*

Be it known that I, EMBURY MCLEAN, a citizen of the United States, residing in the borough of Brooklyn, city and State of New York, have invented certain new and useful Improvements in Pressure-Regulating Valves, of which the following is a specification.

This invention relates to valves of a class having a diaphragm backed by a spring and controlling a valve for determining passage of fluid under pressure, as steam.

The object of the invention is to make such valves more reliable in action and to increase the range of movement of the diaphragm, and consequently of the valve which it controls. To this end a relatively light spring is applied to the diaphragm and the additional pressure required is afforded by hydrostatic pressure. Thus, for instance, if the back pressure upon the diaphragm is to be one hundred pounds its spring may represent ten pounds and a column of fluid the remaining ninety pounds. So far as I am aware such an organization is broadly new and has manifest advantages.

The accompanying drawing illustrates the invention applied to a form of the well-known Foster diaphragm-valve.

*a* is the usual diaphragm, to which is attached the head or member *b*, connected by links or levers to the valve-spindle *c*. Steam entering at the left of the valve-casing passes by passage *d* to the under side of the diaphragm. The construction illustrated is well known. Applied to the face of the diaphragm is a spring *e*, the pressure of which is adjustable by means of a screw-bolt *f*, provided with a lock-nut. Connecting with the space above the diaphragm is a vertical pipe *g*, connected at the top to a fluid-supply tank. In the example illustrated it may be assumed that the pressure upon the upper face of the valve and against which the steam-pressure beneath works is one hundred pounds and that, say, ten or fifteen pounds thereof may be represented by the reaction of the springs *e* and the remainder by the pressure of the column of liquid.

Of course the invention may be embodied in a variety of forms.

Having thus fully described my invention, what I claim, and desire to secure by Letters Patent, is—

1. A pressure-regulating valve, comprising a casing having a diaphragm extending therethrough, a valve member, and connections between the diaphragm and the valve member, means for applying hydrostatic fluid-pressure to one side of the diaphragm, and a spring interposed between the diaphragm and the top of the casing for supplementing the fluid-pressure.

2. A pressure-regulating valve, comprising a casing having an inlet and an outlet for the flow of fluid, a valve member therefor, a chamber arranged above the portion of the casing containing the valve, a diaphragm extending through said chamber and dividing the same into two compartments, means for admitting a fluid to one of said compartments, and a spring extending through said compartment and bearing upon the diaphragm to supplement the action of the fluid.

3. In a pressure-regulating valve a chamber having a diaphragm dividing the same into compartments, means for applying hydrostatic pressure to one side of the diaphragm, and a tension device interposed between the diaphragm and the top of the casing, and bearing against said diaphragm to supplement the action of the hydrostatic pressure.

4. A pressure-regulating valve comprising a casing having a fluid inlet and outlet, a valve controlling the passage between the inlet and outlet, a chamber arranged above the valve and forming a part of the casing, a diaphragm extending through such chamber and dividing the same into compartments, a connection between the diaphragm and the valve, mechanical means interposed between the top of the casing and the upper side of the diaphragm for exerting a degree of pressure thereon, and means for supplementing the action of the mechanical means by hydrostatic pressure greatly in excess of the pressure exerted by such mechanical means.

In testimony whereof I have signed my name to this specification in the presence of two subscribing witnesses.

EMBURY McLEAN.

Witnesses:
 R. B. CAVANAGH,
 C. J. RATHJEN.